United States Patent [19]

Sudimak et al.

[11] Patent Number: 4,799,818
[45] Date of Patent: Jan. 24, 1989

[54] SYSTEM FOR MOUNTING AN ITEM TO A POST

[75] Inventors: Michael J. Sudimak, Shavertown; Robert J. Cohn, Dallas, both of Pa.

[73] Assignee: InterMetro Industries Corp., Wilkes-Barre, Pa.

[21] Appl. No.: 28,731

[22] Filed: Mar. 23, 1987

[51] Int. Cl.$^4$ ................................................. F16B 7/10
[52] U.S. Cl. .................................... 403/107; 248/412; 108/144; 211/208
[58] Field of Search .................... 403/107, 106, 110; 248/412, 246; 108/144; 211/208, 205

[56] References Cited

U.S. PATENT DOCUMENTS

| | | |
|---|---|---|
| 2,032,023 | 2/1936 | Lisicke . |
| 2,388,056 | 10/1945 | Hendricks . |
| 2,705,119 | 3/1955 | Ingwer . |
| 2,716,533 | 8/1955 | Freeman . |
| 2,947,556 | 8/1960 | Wenger . |
| 3,182,846 | 5/1965 | LaKaff . |
| 3,245,365 | 4/1966 | Doherty . |
| 3,344,756 | 10/1967 | Kelson . |
| 3,424,111 | 1/1969 | Maslow ............................. 108/144 |
| 3,458,234 | 7/1969 | Bates . |
| 3,675,598 | 7/1972 | Kesilman et al. ................. 108/144 |
| 3,757,705 | 9/1973 | Maslow ............................. 108/144 |
| 4,627,543 | 12/1986 | Nicely ............................. 108/144 X |

FOREIGN PATENT DOCUMENTS

| | | |
|---|---|---|
| 135665 | 11/1902 | Fed. Rep. of Germany . |
| 855715 | 2/1940 | France . |
| 729857 | 5/1955 | United Kingdom ................ 403/110 |

Primary Examiner—Andrew V. Kundrat
Attorney, Agent, or Firm—Fitzpatrick, Cella, Harper & Scinto

[57] ABSTRACT

A system for securing a member, such as a shelf, to a vertical support column and holding the member in a desired position on the column includes a rotary sleeve system whose resistance to downward motion is directly proportional to the downward force applied. A conical frustum shaped collar having an integral pin extending inwardly from its inside surface rests on top of a split conical frustum shaped sleeve having configurations in the split to receive the pin in one of two positions, an unlocked position and a locked position. A horizontal portion of the slit may be provided for restricting downward motion of the collar with respect to the sleeve to maintain the split in an open configuration, allowing free movement of the rotary sleeve system up or down the vertical column.

12 Claims, 2 Drawing Sheets

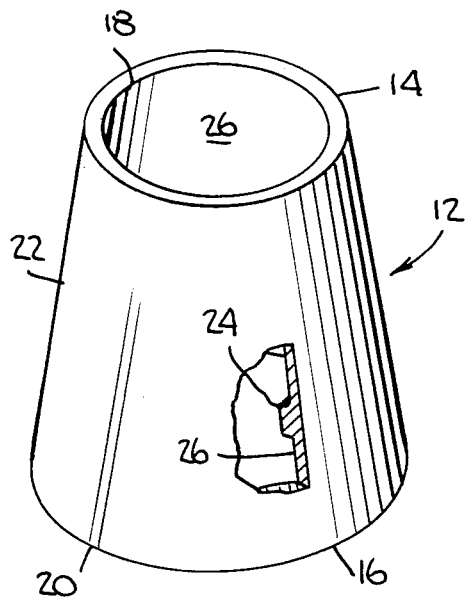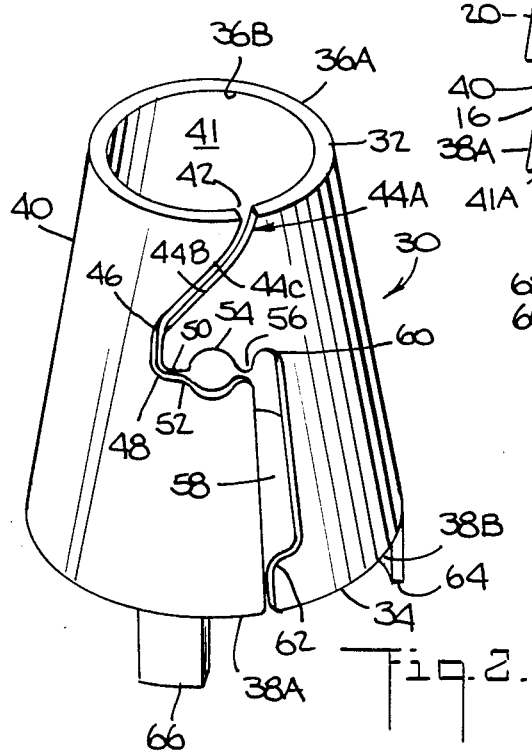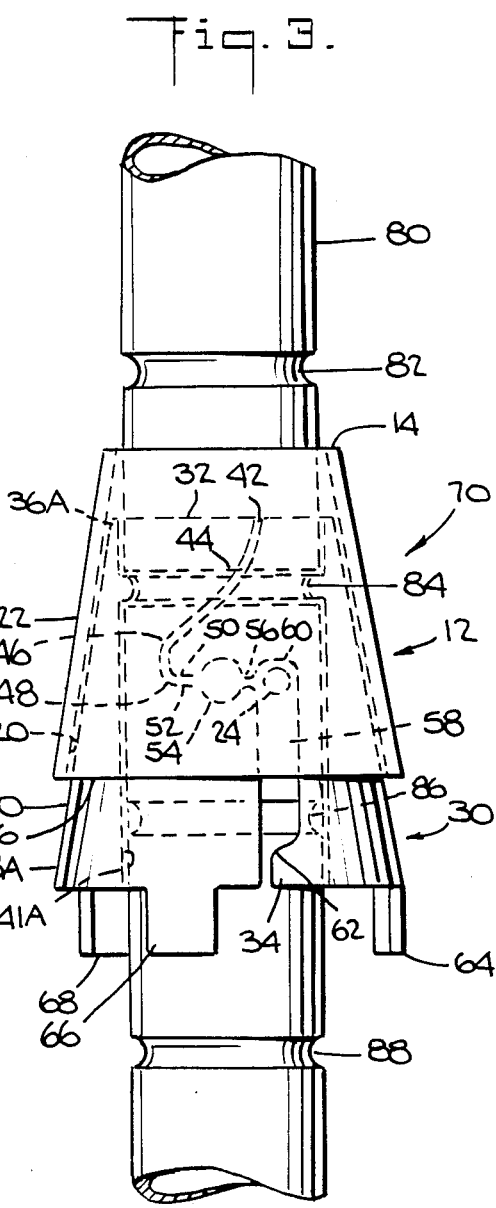

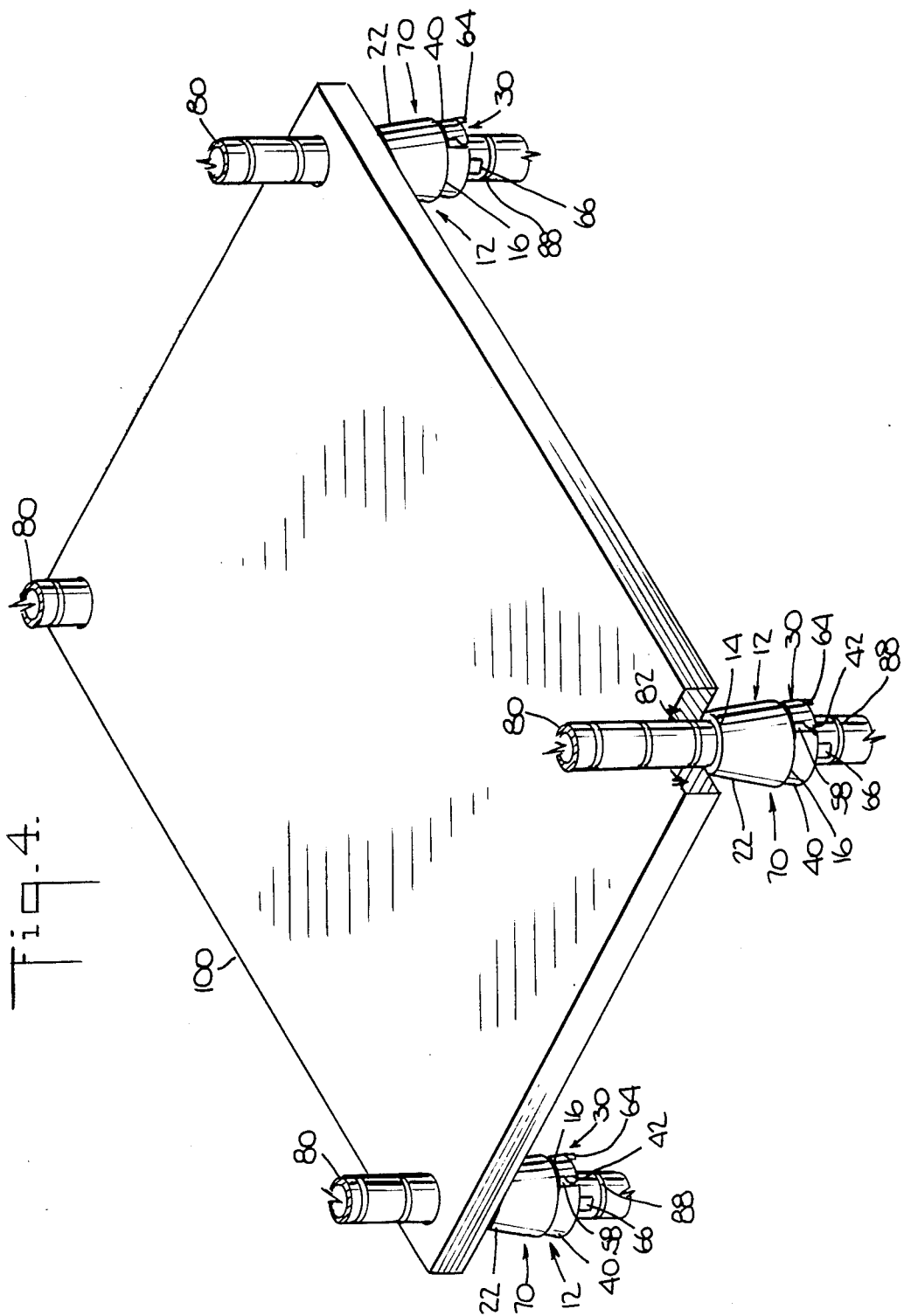

SYSTEM FOR MOUNTING AN ITEM TO A POST

BACKGROUND OF THE INVENTION

1. Field of the Invention

The present invention relates to a system for securing an item such as a shelf or support hook to a column, and more particularly, to a system including the column or post and a single element constituted by two pieces which are loosely coupled yet cooperate so that, when secured to the post, the resistance of the element to a downward force increases with an increase in the force exerted.

Known shelving systems are disclosed in U.S. Pat. Nos. 3,424,111 and 3,757,705 both to Louis Maslow and assigned to the assignee of the subject invention. These shelving systems include a plurality of vertically extending columnar support posts each having a series of uniformly spaced annular grooves formed on its outer surface. A sleeve unit, one for each location at which an element is to be supported, is constructed of two complementary partially tubular members adapted to encircle a corresponding post. Each sleeve unit is provided with a raised annular rib, formed on its inner surface and which may engage any one of the annular grooves on the post.

The outer surface of each sleeve unit is shaped as a conical frustum and its inner surface is generally shaped as a right cylinder so that the wall of the sleeve unit is thickest at the bottom.

Each element to be supported, such as a shelf, is provided with a collar. Each of these collars has a conical frustum shaped inner wall adapted to nest on the outer surface of the sleeve units. Accordingly, application of a load to the shelf causes each collar to press downwardly on its associated sleeve unit with their respective conical surfaces in tight wedging engagement.

The sleeve is positioned along the length of the post so that the annular rib engages one annular groove on the post. The engagement of the rib and groove together with the frictional engagement between the outer wall of each support post and the inner surface of the sleeve units prevent downward vertical movement of the sleeve units, maintaining the shelf in a stable, supported position. Moreover, as the load on the shelf is increased, the radially inwardly directed force resulting from the engagement of the conical wall of each collar and the mating surface of each sleeve unit increases, thus increasing the frictional force between the sleeve units and the support posts. While the system of the Maslow Patents has proven to be quite satisfactory for its intended purposes, it has been observed that the two-part sleeve is not captured with either a collar on the shelf or a corner post. Therefore when the system is disassembled for shipment or storage the sleeve components, which are relatively small, may be lost or misplaced.

2. Description of the Prior Art

Systems for securing items, such as shelves, to vertical posts, have taken many forms in prior art. One type of system for securing a shelf to a post, and deemed relevant to the present invention, is illustrated in U.S. Pat. No. 3,657,598 (Kesilman, et al.) and includes a sleeve which is mounted on the corner of a shelf. The sleeve has a screw extending inwardly in contact with the post about which the sleeve is mounted. When the screw is tightened, it pulls the opposite portion of the sleeve toward the post while fitting tightly against the post itself to increase the radial force holding the shelf in position. If the shelf is to be fixed at predetermined positions, the post may have detents or through-holes for receiving the tightening screw. If no detents or through-holes are provided, the screw can mar and eventually damage the posts. Furthermore, overtightening the screw may strip its threads, resulting in insecure positioning of the shelf on the post.

A commercially available product sold under the name "Cidelcem," which provides for unrestricted positioning of a shelf on vertically extending corner posts, includes a collar fixed to the shelf and having a conical inner wall that terminates at its lower extremity in a cylindrical thread. A conical inner ring, encircling a corner post, mates with the inner wall of the collar and is urged into wedging engagement therewith by a nut threaded into the cylindrical thread in the inner wall of the collar. The wedging action thus created collapses the ring into engagement with the post.

However, in this system, it is difficult to tighten the nut sufficiently to secure the shelving at a fixed location on the post. That is, when a vertical load is applied, the shelving may slip on the posts.

Other less relevant shelving systems are disclosed in U.S. Pat. Nos. 3,245,365 (Doherty); 3,344,756 (Kelson); and 3,182,846 (LaKaff). Still other structures for supporting a member on a vertical column are shown in U.S. Pat. Nos. 2,032,023 (Lisicke); 3,458,234 (Bates); 2,705,119 (Ingwer); 2,388,056 (Hendricks); 2,716,533 (Freeman); 2,947,556 (Wenger) French Pat. No. 855,715 (Pollack); and German Patentschrift No. 135,665. None of these, however, is as pertinent to the subject invention as those discussed in greater detail above.

SUMMARY OF THE INVENTION

The present invention constitutes a method and apparatus for securing an item, such as a shelf or a support hook, to a vertical post or column and holding the member in place on the post.

According to one aspect of the invention, a two piece assembly comprises an outer collar, having an internal conical frustum shape, meeting on a complementary shaped split sleeve. The collar has an engagement pin extending inwardly from its inner surface and the sleeve has a split extending from its top to its bottom and is configured to receive the engagement pin in one of three positions, namely, a free movement position, an unlocked position, and a locked position.

In the unlocked position, the collar allows the sleeve to adopt a split, relaxed attitude while the collar remains loosely nested on the sleeve. In this position, the sleeve and collar may move freely up the vertical post but will assumed the locked position when moved downwardly. In the free movement position, the collar and sleeve are arranged such that the engagement pin is disposed in an area restricting close contact between the collar and sleeve, maintaining the split in an open relaxed attitude. In this position, the sleeve and collar may move freely up and down the vertical support column. In the locked position, the collar fits tightly down around the sleeve, forcing the split to close and effectively decreasing the inner circumference of the sleeve to that of the vertical support column. In this position, frictional force prevents motion of the sleeve with respect to the column.

In another aspect, the sleeve may have an arcuate shaped bead around its inner surface and the vertical support column may have a similarly arranged groove to receive the bead to provide a positive locking engagement between the sleeve and the vertical column.

BRIEF DESCRIPTION OF THE DRAWINGS

FIG. 1 is a partially cut-away perspective view of a frusto-conical shaped collar in accordance with the preferred embodiment of the present invention.

FIG. 2 is a perspective view of a frusto-conical shaped sleeve in accordance with the preferred embodiment of the present invention.

FIG. 3 is an elevational assembly view partly in phantom, illustrating the collar of FIG. 1 and the sleeve of FIG. 2 forming a support sleeve system in accordance with the present invention; and FIG. 4 is a perspective view, partly broken away, illustrating a shelf supported by the rotary sleeve system of FIG. 3.

DETAILED DESCRIPTION OF THE PREFERRED EMBODIMENT

Referring to FIGS. 1 and 2, the preferred embodiment of the present invention includes a collar 12, illustrated as a conical frustrum, having an inner circular top 14 and an inner circular base 16, each having an inner circumference 18 and 20, respectively. The cut-away portion of side 22 illustrates a pin 24 directed inwardly from the inside surface 26 of collar 12. The purpose of pin 24 will later be described.

A sleeve 30 is illustrated in FIG. 2 as having an annular top 32 and an annular base 34, each shaped to form a circle having outer and inner circumferences 36A, 36B, 38A, and 38B, respectively.

The outer surface of collar 12 may be any suitable shape. However, the inner circumference 20 of the collar at base 16 is smaller than outer circumference 38A, yet greater than circumference 36A of sleeve 30.

The sleeve 30 is shaped as a conical frustum having the annular top 32 and annular base 34, the outer circumference 38A of which is greater than the outer circumference 36A of the top. In the preferred embodiment, the outer circumference of the larger end of the sleeve 30 is greater than the inner circumference of the larger end of the collar 12 but the outer circumference of the smaller end of the sleeve 30 is smaller than that of the smaller end of the collar. Sleeve 30 includes an outer conical surface 40 and is illustrated as having a cylindrical inner surface 41 in the preferred embodiment.

The sleeve 30 is split to provide a slit 42 which extends from its top 32 to its base 34. The slit 42 has a generally helical portion 44A, with a lower edge 44B and upper edge 44C, extending from its initiation point on the outer and inner circumferences 36A and 36B, respectively, to a point 46 at which it turns downwardly to a point 48, then bends ninety degrees to define a short horizontal portion 50 extending to point 52 at which point slit 42 widens to form a bulbous area 54, which narrows again at point 56. The slit 42 then bends downwardly at ninety degrees and enlarges to define a relatively wide open area 58 which narrows at point 62 and continues to outer and inner circumferences 38A and 38B, respectively. The slit includes a small, upwardly extending open area 60 immediately adjacent point 56 and large open area 58 narrows at point 62 and continues to outer and inner circumferences 38A and 38B, respectively.

As shown in FIGS. 2 and 3, legs 64, 66 and 68 extend downwardly from the base 34 of sleeve 30.

The assembled configuration of the support system 70 of the invention comprising collar 12, sleeve 30, and a post 80 is illustrated in FIG. 3.

As shown, the sleeve 30 is mounted on a right cylinder post column 80 having vertically spaced annular grooves 82, 84, 86 and 88. Column 80 may, of course, have any horizontal cross sectional shape, as may inner surface 41 of sleeve 30. The surface 41 may have a horizontal cross sectional shape different from that of column 80, but maximum efficiency is achieved when inner surface 41 and column 80 are similarly shaped.

The sleeve 30 is placed on column 80 so that circumference 36B of top 32 circumscribes the outer surface of column 80. Collar 12 is configured to nest loosely upon sleeve 30 and is placed upon sleeve 30 such that pin 24 projects into open area 58. As collar 12 is urged in a downward direction, its inner surface 26 presses against outer surface 40 of sleeve 30. Due to the slideably engaging conical frustum shapes of inner surface 26 of collar 12 and outer surface 40 of sleeve 30, downward forces on the exterior of collar 12 are redirected to compression forces tending to close the slit 42. The compression forces are translated to frictional forces between the surface of column 80 and the inner surface of sleeve 30. Outer surface 40 is illustrated as frusto-conical while inner surface 41 is illustrated as a right cylinder having an inner circumference slightly larger than the cross sectional circumference of column 80.

In operation, when the parts are assembled as shown in FIG. 3 and the rotary sleeve system 70 is to be moved, the pin 24 is raised to area 60 of open area 58. When pin 24 is located in area 60, collar 12 is lifted from sleeve 30, sleeve 30 is unlocked from its close contact position against column 80 and the sleeve and collar assembly may easily be moved up column 80. Pin 24 may then be moved into bulbous area 54, to a free movement position, and the assembly may be moved up or down column 80. By moving pin 24 into bulbous area 54, the assembly may easily be moved up since pin 24 engages the upper surface defining bulbous area 54 to pull sleeve 30 up when the collar 12 is lifted. The assembly may also easily be moved down since pin 24 engages the lower surface defining bulbous area 54 to push sleeve 30 down column 80 without closing slit 42 when the collar 12 is lowered. This prevents pin 24 and collar 12 from sliding down upon sleeve 30 which would force slit 42 to close and the sleeve tightly to engage the column 80. Thus, when pin 24 is in bulbous area 54, the rotary sleeve system 70 may be moved freely down column 80 without closing or tightening as it is moved.

When assembly 70 reaches its desired location along the column 80, pin 24 is moved from bulbous area 54 to notch 60 and collar 12 is moved down along the surface 40 of sleeve 30, while pin 24 moves to the lower portion of open area 58. This motion forces slit 42 to close causing the sleeve 30 snugly to engage column 80. As the force placed on collar 12 is increased, slit 42 becomes narrower forcing a tighter fit against column 80 until inner circumference 36 essentially equals the circumference of column 80. Thus, as a downward force is placed on collar 12, the resistance to downward motion of the assembly 70 is increased.

As shown in FIG. 3, a rib 90 may be added to the inner surface 41 of the sleeve 30 to mate with any one of annular grooves 82, 84, 86 and 88 to provide a more positive locking engagement of the assembly 70 relative to the column 80.

The helical portion 44A of the slot 42 in the sleeve 30 may act as a ramp to further spread the sleeve open. With the pin 24 of collar 12 in either position 54 or 60, and when an upward force is applied to the collar 12, the pin 24 will lift the helical edge 44B into contact with edge 44C such that the edges 44B and 44C slide one on the other in screw-like fashion. Therefore, the sleeve will distort vertically and its inside circumferences 36B and 38B will become enlarged. A downward force of the pin 24 at position 54 will cause edge 44C to contact edge 44B and sleeve 30 will behave in the reverse manner to that described above. If the rib 90 is added to the sleeve, it will be distorted along with the sleeve. Such distortion will reshape the rib from a planar ring to a helical ring so that the rib will not engage the annular grooves 82, 84, 86, or 88 in the column 80 until the pin 24 is again moved down in the slot 58.

The sleeve, collar, column system of the present invention provides an arrangement for positively locking in position any item which may be attached to collar 12. An excellent application for the rotary sleeve system 70 involves the attachment of an item, such as a shelf, to collar 12, as illustrated in FIG. 4. Each of the corners of the shelf or any convenient parts thereof may be attached to a respective collar 12 to direct a downward force to collar 12 to close slit 42 of sleeve 30. The shelf may rest on the top 14 of collar 12 or it may be mounted circumferentially on side 22.

Referring now to FIG. 4, a shelf 100 is illustrated as having a corner location mounted on a sleeve 12. The shelf 100 is illustrated as being mounted so that it engages collar 12 at its top 14. However, the shelf may be secured to each collar 12 at the midpoint of its side 22 or at any point along its side 22. To place shelf 100 in position on columns 80, shelf 100 may be raised or lowered into position by first lifting shelf 100 which raises collars 12 from sleeves 30, moving pins 24 upwardly in open areas 58. Once collar 12 is lifted from its rest position on sleeve 30, slit 42 expands and inner circumference 36 increases to a value greater than the circumference of column 80. In this position, shelf 100 may be raised to a new position at which point the exertion of a downward force on shelf 10 will urge pin 24 to the lower portion of area 58 of the sleeve 30, and enabling the collar 12 to close the slit 42.

When the shelf 100 is to be lowered on columns 80, it is first lifted, as indicated, in conjunction with the raising operation to lift collar 12 from surface 40 of the sleeve 30. This action moves the pin 24 to the upper portion of area 58 of the slit 42. Thus, the sleeve 30 is rotated so that the pin 24 moves through narrow area 56 and into bulbous area 54 where downward motion of the collar 12 with respect to the sleeve 30 is restricted. Once this procedure is accomplished for all four support locations of shelf 100, the shelf may be lowered to a new position on columns 80. Upon reaching the new position, the sleeves 30 are rotated so that the pin 24 moves from bulbous area 54 of slit 42 through narrow area 56 into the upper portion of open area 58. The shelf 100 is then lowered urging the pin 24 to the lower portion of area 58 and allowing the collar 12 to act on the sleeve 30 to close slit 42. As indicated previously, a rib 90 may be added to inner surface 41 of the sleeve 30, to mate with annular grooves found in the column 80. The rib 90 may be configured such that when slit 42 is in its full open position, the rib will touch the surface of column 80 to add a slight frictional force to retard free motion of the sleeve 30 in either the upward or downward direction. Thus, once the pin 24 of collar 12 is moved to bulbous area 54 of the sleeve 30, the shelf 100 will not drop to the surface directly below it.

The present invention may also be incorporated in systems having a single column with one or more sleeve, collar assemblies mounted on it. One such application is, for example, in mounting containers of intravenously administered liquid on a single post in hospitals.

Accordingly, the present invention provides a method and apparatus for positively locking into position a shelf or the like onto a post or column. In the preferred embodiment, the shelf is attached to the sleeve, collar system such that the sleeves travel with the shelf. However, the rotary sleeve system described may be used separately from the shelf since it is configured in such a manner that the collar and sleeve remain together as a unit and can operate independently.

The configuration of the system of the present invention improves upon multi-piece systems for which pieces may be lost. The system of the present invention, also permits adjustment or placement of an element like a shelf with minimum effort.

While the present invention has been described with reference to a preferred embodiment, it is to be understood that this is for illustrative purposes only and that the present invention should not be limited thereto, but only by the scope of the following claims:

What is claimed is:

1. A system for securing a member to a vertical column having outer surface, said system comprising:
    a collar having an outer surface, formed to be associated with the member, and a frusto-conical inner surface;
    an engagement pin mounted on said inner surface of said collar and extending inwardly therefrom; and
    a sleeve having a frusto-conical outer surface formed to be rotatably mounted within said collar in mating engagement with said inner surface of said the outer surface of the vertical column thereby to engage the vertical column, said sleeve having a collapsible slit extending from its top to its base and being formed to receive said engagement pin in a locked position wherein said collar fits in tight engagement on said sleeve closing said slit, and an unlocked position wherein said collar fits loosely on said sleeve permitting said slit to remain in an open relaxed configuration.

2. The rotary sleeve system according to claim 1, wherein said slit includes a horizontal portion formed to receive said engagement pin in a free movement position at which relative motion between said collar and said sleeve is restricted and said slit remains in an open relaxed configuration.

3. The rotary sleeve system according to claim 1, wherein the column has spaced annular grooves along its surface and said sleeve has a bead around said inner surface formed to fit into said grooves of the column.

4. Apparatus for securing an item to a vertical support column, comprising:
    a split sleeve, having a split therein, with an inner surface having a horizontal cross-sectional shape generally conforming to the horizontal cross-sectional shape of the vertical support column and a conical frustum shaped external surface having its narrow portion toward the upper portion of the vertical support column; and a collar having a conical frustum shaped inner surface formed to seat on said external surface of said sleeve and having an engagement pin extending inwardly;

wherein said split allows said sleeve to assume two positions including a first unlocked position wherein said split remains in a substantially open position while said collar loosely engages said sleeve and a second locked position wherein said split is substantially closed and said collar tightly engages said sleeve, effectively reducing the horizontal cross-sectional shape of said sleeve so that said inner surface of said sleeve may rest snugly against said vertical support column.

5. The apparatus according to claim 4, wherein said vertical column includes horizontal grooves spaced along its length and said sleeve includes a bead on its inner surface formed selectively to mate with said horizontal grooves.

6. The apparatus according to claim 4 or 5, wherein said split includes a horizontal portion adapted to receive said engagement pin in said unlocked position to maintain said collar loosely engaging said sleeve.

7. A method for mounting on a column a rotary sleeve system having a sleeve with an outer surface and an inner surface and a collar mounted for rotation with respect to the sleeve, the collar having an inner surface with an engagement pin extending inwardly therefrom, said method comprising the steps of:

providing a separation in said sleeve extending from its top to its base, said separation providing two positions for said engagement pin including a first unlocked position and a second locked position, and having a horizontal portion associated with said first unlocked position;

positioning said collar relative to said sleeve so that said engagement pin may travel from said locked position to said unlocked position by rotating said sleeve relative to said collar to locate said engagement pin in said horizontal portion and thereby deter said engagement pin from travelling to said locked position;

sliding said sleeve to a selected point on said vertical column;

rotating said sleeve relative to said collar so that said engagement pin travels from said unlocked position to said locked position; and locking said sleeve at said selected point by pressing said collar on said sleeve to close said separation in said sleeve.

8. The method according to claim 7, wherein said rotating step includes the step of:

rotating said sleeve to move said engagement pin to said unlocked position from said horizontal portion.

9. A system for securing a member to a vertical column having an outer surface, said system comprising:

a collar having an outer surface, formed to be associated with the member, and a frusto-conical inner surface;

an engagement pin mounted on said inner surface of said collar and extending inwardly therefrom; and a sleeve having a frusto-conical outer surface formed to be rotatably mounted within said collar in mating engagement with said inner surface of said collar and having an inner surface configured to correspond to the outer surface of the vertical column thereby to engage the vertical column, said sleeve having a expandable slit extending from its top to its base and being formed to receive said engagement pin in a locked position wherein said collar fits in tight engagement on said sleeve closing said slit, and an unlocked position wherein said collar fits loosely on said sleeve permitting said slit to remain in a closed configuration.

10. The rotary sleeve system according to claim 9, wherein said slit includes a horizontal portion formed to receive said engagement pin in a free movement position at which relative motion between said collar and said sleeve is restricted and said slit remains in a closed configuration.

11. A rotary sleeve system according to claim 9 or 10 whereby the opposing edges of said slit are formed such that relative displacement of said slit edges along the direction of the sleeve axis will cause interference between the slit edges and said interference will open said sleeve if said relative displacement is increased.

12. The rotary sleeve system according to claim 9 wherein the column has spaced annular grooves along its surface and said sleeve has a bead around said inner surface formed to fit into said grooves of the column.

* * * * *

UNITED STATES PATENT AND TRADEMARK OFFICE
CERTIFICATE OF CORRECTION

PATENT NO. : 4,799,818
DATED : January 24, 1989
INVENTOR(S) : MICHAEL J. SUDIMAK, ET AL.

It is certified that error appears in the above-identified patent and that said Letters Patent is hereby corrected as shown below:

COLUMN 5

Line 43, "shelf 10" should read --shelf 100--.
    Line 64, "found" should read --formed--.

COLUMN 6

Line 39, "said the" should read --said collar and having an inner surface configured to correspond to the--.

COLUMN 8

Line 25, "a" should read --an--.

Signed and Sealed this

Eighth Day of May, 1990

Attest:

HARRY F. MANBECK, JR.

*Attesting Officer*      *Commissioner of Patents and Trademarks*